United States Patent [19]
Watanabe et al.

[11] Patent Number: 5,929,133
[45] Date of Patent: Jul. 27, 1999

[54] ANTI-BACTERIAL FILM SUITABLE FOR FOOD PACKAGING

[75] Inventors: Takayoshi Watanabe; Satoru Aoki; Shinichi Ohta, all of Shimodate; Katsuhiro Shirono; Atsushi Tanaka, both of Kitakyushu, all of Japan

[73] Assignee: Hitachi Chemical Filtec, Inc., Tokyo, Japan

[21] Appl. No.: 08/875,118

[22] PCT Filed: Jan. 19, 1996

[86] PCT No.: PCT/JP96/02023

§ 371 Date: Jul. 21, 1997

§ 102(e) Date: Jul. 21, 1997

[87] PCT Pub. No.: WO97/30115

PCT Pub. Date: Aug. 21, 1997

[30] Foreign Application Priority Data

Feb. 16, 1996 [JP] Japan .................................. 8-029046

[51] Int. Cl.⁶ .............................. C08K 5/15; C08K 5/51; C08K 5/36; C08K 5/09
[52] U.S. Cl. .......................... 523/122; 524/109; 524/153; 524/289; 524/300; 524/305; 524/410; 524/413; 524/430; 524/431; 524/433
[58] Field of Search ............................ 523/122; 524/109, 524/153, 289, 300, 305, 410, 413, 430, 431, 433

[56] References Cited

U.S. PATENT DOCUMENTS 4,299,759  11/1981  Miyata et al. ........................... 524/441
5,698,229  12/1997  Ohmusi et al. ......................... 424/604

FOREIGN PATENT DOCUMENTS 07033616  2/1995  Japan .

OTHER PUBLICATIONS

Database WPI, Section Ch, Week 9515, Derwent Publications Ltd., London, GB: Class A60, AN 95–110508 XP002015412.

Database WPI Section Ch, Week 9430 Derwent Publications Ltd., London, GB:Class A 14, AN 94–245764: XP002015410 & JP, A, 06 179 787 (Shinetsu Polymer KK), Jun. 28, 1994.

*Primary Examiner*—Kriellion S. Morgan
*Attorney, Agent, or Firm*—Stevens, Davis, Miller & Mosher, L.L.P.

[57] ABSTRACT

Anti-bacterial film according to the present invention is suitable for use as food packaging wrap, and is given with the properties required for such film, such as a clinging property, transparency, and an anti-fogging property, as well as a high anti-bacterial property. The anti-bacterial film according to the present invention comprises, for 100 weight parts of PVC resin, 5 to 50 weight parts of a plasticizer, 0.3 to 3.0 weight parts of a stabilizer, 0.02 to 1.0 weight parts of hydrotalcite, 0.5 to 5.0 weight parts of an anti-fogging agent, and 0.02 to 2.0 weight parts of an anti-bacterial compound. The anti-bacterial compound may consist of a compound obtained by ion exchanging metallic ions of inorganic oxoacid salt in the form of irregular particles having a particle diameter no more than 0.5 $\mu$m with metallic ions having an anti-bacterial property, or a compound obtained by physically or chemically attaching metallic components having an anti-bacterial property to colloidal particles of inorganic oxides such as $SiO_2$, $TiO_2$, $SiO_2.Al_2O_3$ and $SiO_2.B_2O_3$ having a particle diameter no more than 500 nm and forming a colloidal solution.

9 Claims, No Drawings

ANTI-BACTERIAL FILM SUITABLE FOR FOOD PACKAGING

TECHNICAL FIELD

The present invention relates to PVC anti-bacterial film which is highly effective in repelling bacteria, and provided with a clinging property, transparency, and an anti-fogging property, and in particular to such anti-bacterial film suitable for use as food packaging wrap.

BACKGROUND OF THE INVENTION

PVC food packaging wrap has been increasingly widely used for packaging fresh food as the importance of supermarkets in the retail business grows. The use of PVC food packaging wrap in homes has also increased with the increase in the use of refrigerators and microwave ovens for preserving and cooking food. The PVC food packaging wrap for such applications are required to have a clinging property for the convenience of wrapping food items, a freshness preserving property based on a suitable degree of air permeability, an anti-fogging property, and transparency.

The known methods for giving an anti-bacterial property to organic high polymer film include the method of dispersing an anti-bacterial inorganic compound in an organic high polymer, and forming the high polymer into film, and the method of applying an anti-bacterial inorganic compound over the surface of organic high polymer film. Known anti-bacterial inorganic compounds include those carrying anti-bacterial ions in zeolite and aluminosilicate.

In the field of food packaging wrap, it is known to use an anti-bacterial compound consisting of zeolite or aluminosilicate carrying anti-bacterial ions to obtain an anti-bacterial property, and to disperse this compound in an organic high polymer which is then formed into film.

However, according to such conventional granular anti-bacterial compounds or compositions, because they do not readily disperse, and can therefore impair the clinging property, transparency and anti-fogging property of the film, the film could lose its property to cling to and wrap around the food items, and the commercial value of the food items could be damaged by failing to show the favorable appearance of the food items through the film when displaying the food items in retail stores so that the film may be considered unsatisfactory for wrapping food items.

Also, when an anti-bacterial compound is added to PVC, the chloride which is released from the resin during the thermal molding process combines with silver and other metallic ions, which are effective in repelling bacteria, and produces water-insoluble silver chloride. Such consumption of the anti-bacterial component severely reduces the anti-bacterial property of the film.

It is possible to add an excess amount of an anti-bacterial compound in the film to offset the consumption of the anti-bacterial compound during the molding process. However, if the anti-bacterial compound is added by such an excess amount, it could ruin the properties of the film which make it suitable for packaging food. If the addition of the anti-bacterial compound is limited so as not to damage the desired properties of the film, it could fail to produce a sufficient effectiveness in repelling bacteria.

BRIEF SUMMARY OF THE INVENTION

In view of such problems of the prior art, a primary object of the present invention is to provide anti-bacterial film which is highly effective in repelling bacteria while maintaining a clinging property, transparency, and an anti-fogging property which are required for the film to be suitable for use as packaging wrap.

A second object of the present invention is to provide anti-bacterial film which is suitable for use as food packaging wrap.

A third object of the present invention is to provide anti-bacterial film which is provided with favorable properties as packaging wrap but is inexpensive to manufacture.

To achieve such an object, the inventors have conceived the present invention by studying various anti-bacterial compounds that may be added to PVC film for packaging food.

The invention as recited in claim 1 is characterized by anti-bacterial film, comprising, for 100 weight parts of PVC resin: 5 to 50 weight parts of a plasticizer; 0.3 to 3.0 weight parts of a stabilizer; 0.02 to 1.0 weight parts of hydrotalcite; 0.5 to 5.0 weight parts of an anti-fogging agent; and 0.02 to 2.0 weight parts of an anti-bacterial compound. This film is provided with favorable properties such as a clinging property, transparency, and an anti-fogging property which make it particularly suitable for use as food packaging wrap.

The invention as recited in claims 2 and 3 is characterized by anti-bacterial film wherein the anti-bacterial compound consists of inorganic oxo-acid salt, such as magnesium metasilicate aluminate, whose metallic ions are ion substituted by anti-bacterial metallic ions.

The invention as recited in claim 4 is characterized by anti-bacterial film wherein the anti-bacterial compound consists of inorganic oxide colloidal particles forming a colloidal solution and having a metallic component, provided with an anti-bacterial property, attached thereto either physically or chemically.

DETAILED DESCRIPTION OF THE PREFERRED EMBODIMENTS

Now embodiments of the anti-bacterial film according to the present invention is described in the following in more detail.

An embodiment of the anti-bacterial film according to the present invention prepared as anti-bacterial food packaging wrap comprises, in addition to PVC resin, a plasticizer, a stabilizer, hydrotalcite, an anti-fogging agent, and an anti-bacterial compound.

The PVC resin may consist of no less than 10 weight % of vinylchloride homopolymer and/or vinylchloride which forms a copolymer, a graft polymer or a block copolymer with monomers suitable for copolymerization. Such comonomers may include olefins such as ethylene, propylene and polybutane, saturated vinyl esters such as vinyl acetate, vinyl laurylate, acrylate esters, and methyl methacrylate esters, unsaturated alkyl esters, alkylvinyl ethers such as vinyl laurylate ether, maleic acid, acrylonitrile, styrene, methyl styrene, vinylidene chloride, vinylidene fluoride, etc.. The polyvinyl chloride may be blended with acrylonitrile-butadiene-styrene, ethylene-vinyl acetate, chlorinated polyethylene, a three dimensional polymer of methyl methacrylate ester-butadiene-styrene, polyvinyl chloride processed with alcohol, halogen containing resins such as chlorinated resins.

As for the plasticizer given as a first component, it may consist of epoxidated oils such as epoxidated linseed oil, epoxidated soybean oil, epoxidated fatty acid alkyl ester, adipate esters having six to ten carbon atoms and straight or branched alkyl groups, hydroxy polycarbonic esters such as tributyl acetyl citrate, and acetylated triethyl, aliphatic dibasic acid esters such as di-normal butyl sebacate, glycol esters such as penta-erythyritol ester, di-ethylene glycol benzoate, phosphate esters such as triphenyl phosphate, trichlesil phosphate, glycerin diaceto monolaurate, chlorinated parafin, polyester. These substances can be used either individually or in combinations.

The amount of the plasticizer that is to be added to the product is adjusted over a range of from 5 to 50 weight parts for 100 weight parts of polyvinyl chloride resin depending on the kinds of the food items that are going to be wrapped, the mode of packaging, and the method of packaging.

The stabilizer which is mixed as a second component may be selected from acetic acid, propionic acid, heptanoic acid, 2-ethyl hexylic acid, caprylic acid, capric acid, lauric acid, palmitic acid, myristic acid, stearic acid, undecylic acid, isostearic acid, 12-hydroxy stearic acid, isodecanoic acid, oleic acid, ricinolic acid, linoleic acid, linolenic acid, docosanoic acid, eicosanoic acid, nodecanoic acid, behelinoleic acid, mixtures of naturally produced fatty acids such as animal fat fatty acid, coconut oil fatty acid, soybean oil fatty acid, wood (tung) oil fatty acid, and rice bran fatty acid, monoacidic carboxylic acids such as lactic acid, citric acid, gluconic acid, sorbic acid, resin acid, actoacetic acid, benzoic acid, naphthenic acid, salicylic acid, p-tert-butyl benzoic acid, butyl benzoic acid, isopropyl benzoic acid, ethyl benzoic acid, toluic acid, xylylic acid, 5-tert-octyl benzoic acid, and cyclo-hexyl carboxylic acid, diacidic or polyacidic carboxylic acids, such as oxalic acid, malonic acid, succinic acid, glutaric acid, adipic acid, pimelic acid, suberic acid, azelaic acid, sebacic acid, phthalic acid, isophthalic acid, terephthalic acid, crophthalic acid, aminophthalic acid, oxyphthalic acid, maleic acid, fumaric acid, citraconic acid, metaconic acid, isoconic acid, and aconitic acid, and calcium or zinc salts of monoester carboxylic acids of these substances.

The following additives, in any desired combination, may be optionally added to the above stabilizer; organic phosphorous acid esters such as tris-nonyl phosphite, 2-tert-butyl-α(3-tert-butyl-4-hydroxyphenyl) p-cumenyl bis-(p-nonyl phenol) phosphite, 4,4'-isopropylidene-diphenyl alkyl (C12–C15) phosphite, tris-(2, 4-tert-butyl phenyl) phosphite, tris-(dinonyl phenyl) phosphite, and distearyl penta erythritol diphosphite, and β-diketones such as stearoyl benzoyl methane, benzoyl acetyl methane, benzoyl hexanol methane, benzoyl octanol methane, diacethyl benzoyl methane, lauroyl benzoyl methane, dibenzoyl methane, and oleyl benzoyl methane, and metallic complex salts of diketones.

The amount of the stabilizer may be adjusted within the range of 0.3 to 2.0 weight parts for 100 weight parts of PVC resin depending on the molding method, the type of the molding device, and the nature of the product.

The hydrotalcite included as a third component can be expressed by the following formula:

$$Mg^{+2}_{1-x} Al_x(OH)_2 A^{2-}_{x/2} \cdot mH_2O \quad (1)$$

where $Mg^{+2}$ is a solid solution of Mg or Mg and Zn, $A^{2-}$ is $CO_2$ or $SO_4$, $0 < x \leq 0.5$, and m is a positive real number.

By adding hydrotalcite, it is possible to retain the anti-bacterial property of the anti-bacterial compound. In other words, by adding hydrotalcite, the chloride which is otherwise released from the PVC resin during the thermal molding process can be captured in a stable manner, and the metallic ions such as silver ions which are responsible for the anti-bacterial property are prevented from generating water insoluble silver chloride by combining with the chloride content so that the anti-bacterial property is preserved.

It is known that, when hydrotalcite is used as a thermal stabilizer for the PVC resin, the thermally molded resin becomes tinted. However, this problem can be substantially eliminated if hydrotalcite is used in combination with magnesium metasilicate aluminate which is an effective anti-bacterial component.

The hydrotalcite can be used in the range of 0.02 to 1.0 weight parts for 100 weight parts of polyvinyl chloride resin.

The anti-fogging agent used as a fourth component may consist of monoglycerin fatty acid ester, poly-glycerin fatty acid ester, and sorbitan fatty acid ester, either individually or as a combination of two or more of them.

The amount of the anti-fogging agent may be adjusted within the range of 0.5 to 5.0 weight parts for 100 weight parts of PVC resin depending on the kinds of the food items that are going to be wrapped, the mode of packaging, and the method of packaging.

The anti-bacterial compound used as a fifth component may consist of either one of two types of material, inorganic oxo-acid salts or colloidal particles of inorganic oxides.

The anti-bacterial compound based on inorganic oxo-acid salts preferably consists of irregularly shaped particles having a particle diameter no more than 2 μm, more preferably no more than 0.5 μm, and is provided with an ion exchanging capability as well as a water insoluble property. An example of such a compound can be found in Japanese patent publication (kokai) No. 02-275627. Because the anti-bacterial compound is water insoluble, it is less likely to be released during use, and can preserve its anti-bacterial property over an extended period of time. Because the particle diameter of the anti-bacterial compound is 0.5 μm or less, and the particles are irregularly shaped, the necessary properties of food packaging film, such as a clinging property, transparency and an anti-fogging property, can be ensured. Therefore, this anti-bacterial compound can be used over a range of particle diameter which is suitable for achieving both a sufficient durability of the anti-bacterial property, and other required properties such as a clinging property.

Examples of inorganic oxo-acid salts include magnesium metasilicate aluminate, calcium silicate, calcium titanate and sodium antimonate. Magnesium metasilicate aluminate is particularly preferable in view of safety and its capability to avoid the tinting of the resin when used in combination with the fourth component. The metallic ions which are ion exchanged with the inorganic oxo-acid salts and demonstrate the anti-bacterial property may consist of Ag, Cu, Zn and Sn, either individually or in combination of two or more of them.

The anti-bacterial compound based on colloidal particles of inorganic oxides may comprise colloidal particles of simple inorganic oxides such as $SiO_2$, $TiO_2$, $ZrO_2$, $Fe_2O_3$, $Sb_2O_5$ and $WO_3$, and colloidal particles of composite inorganic oxides such as $SiO_2 \cdot Al_2O_3$, $SiO_2 \cdot B_2O_3$, $SiO_2 \cdot P_2O_5$, $TiO_2 \cdot CeO_2$, $TiO_2 \cdot ZrO_2$, $SiO_2 \cdot ZrO_2$, $SnO_2 \cdot Sb_2O_5$, $SiO_2 \cdot Al_2O_3$, $TiO_2 \cdot SiO_2$, $TiO_2 \cdot CeO_2$, $ZrO_2 \cdot SiO_2$, $Al_2O_3 \cdot MgO$, $CaOSiO_2$, and $TiO_2 Fe_2O_3$, having a particle diameter no more than 500 nm and forming a colloidal solution, and an anti-bacterial metallic component such as Ag, Cu, Zn and Sn attached to the particles either physically or chemically. An example of such a compound is disclosed in Japanese patent publication (kokai) No. 07-33616. Because the anti-bacterial compound is in the form of colloidal solution, and is provided with an extremely small particle diameter, it can be favorably dispersed, and would not impair the clinging property, transparency and anti-fogging property of the packaging film. Because the anti-bacterial compound can gradually seep out to the surface of the film along with the additives such as the plasticizer and the anti-fogging agent over time, it can maintain a high concentration on the surface of the film over an extended period of time.

The anti-bacterial compound based on inorganic oxo-acid salts and the anti-bacterial compound based on colloidal particles of inorganic oxides are both used by the range of 0.02 to 2.0 weight parts for 100 weight parts of polyvinyl chloride.

The polyvinyl chloride resin may further contain pigments, lubricants, fillers, anti plate out agents, anti-oxidizing agents, mold releasing agents, viscosity reducing agents, surface reactants, fluorescent pigments and dyes, surface processing agents, cross-linking agents, reinforcing agents, and other assisting agents, as required.

Embodiments of the anti-bacterial food packaging film according to the present invention and examples for comparison are described in the following. However, these embodiments are not intended as limiting the present invention.

In the following embodiments, the ingredients listed in Table 1 were mixed, and after hot blending in a Henschel type heater mixer, the mixture was transferred to a cooler mixer so as to be cooled therein. The obtained mixture was formed into film by the cast extruding process.

In Embodiment 1, the metallic ions of magnesium meta-silicate aluminate in the form of irregularly shaped particles having a particle diameter no more than 0.5 μm were ion exchanged with metallic ions having an anti-bacterial property to obtain the anti-bacterial compound.

In Embodiment 2, metallic components having an anti-bacterial property was either physically or chemically attached to colloidal particles of inorganic oxides such as $SiO_2$ and $TiO_2$ having a particle diameter no more than 500 nm and forming a colloidal solution to obtain the anti-bacterial compound.

Example 1 used a known zeolite anti-bacterial compound, and Example 2 did not contain any anti-bacterial compound.

The transparency, clinging property, anti-fogging property and anti-bacterial property were evaluated for each of the embodiments and examples according to the following test methods, and the results are included in Table 1.

The transparency was tested by using an automatic fogging meter (NDH-24, made by Nihon Denshoku Kogyo KK), and a gloss meter (GM-3D, made by Murakami Shikisai KK). Food packaging film is desired to have a high level of transparency, and to be free from fogging as much as possible.

The clinging property was tested by measuring the adhesive force obtained as the T peeling strength of film which is 250 mm in width, by using Strograph R2 made by Toyo Seiki KK The evaluation of transparency and clinging property is based on the amount of reduction from those obtained with the film of Example 2. A reduction by less than 3% is indicated by ⊚, a reduction by 3 to 5% is indicated by ○, and a reduction by more than 5% is indicated by X.

The evaluation of fogging was conducted as follows. 200 ml of distilled water at a temperature of 20±3° C. was poured into a 500 ml beaker, and the film was stretched across the upper open end of the beaker without producing any creases. It is then placed in a refrigerator kept at a temperature of 0 to 3° C., and the changes in the condition of the surface of the film was observed.

The anti-fogging property was evaluated as ⊚ when there was substantially no water condensation on the surface, as ○ when there was a reasonable amount of water condensation on the surface, and X when there was conspicuous amount of water condensation on the surface.

The anti-bacterial property was evaluated by using *staphlococcus aurens*, and the extinction ratio of the bacteria was given as a measure of the anti-bacterial property. Film of each of the embodiments and examples was cut into a 50 mm by 50 mm square, and was placed in a sterilized laboratory dish. 0.5 ml of culture medium fluid (including $10^4$/ml of *staphlococcus aurens*) was placed in the dish, and after leaving it alone for 24 hours at 35° C., the extinction ratio was computed by counting the number of live bacteria. The negative sign indicates a growth of the bacteria.

The compositions used in the above embodiments are as follows: polyvinyl chloride: TK-1100 made by Shin-etsu Kagaku Kogyo KK plasticizer: di-isononyl adipate—DINA made of Mitsubishi Kagaku Vinyl KK plasticizer: epoxidated linseed oil -O-180 made by Asahi Denka Kogyo KK Ca–Zn stabilizer: mixture of calcium carboxylate, zinc carboxylate, calcium salts of aromatic acids, organic phosphorous acid esters, and anti-oxydizing agent FD-30 made by Akishima Kagaku Kogyo KK hydrotalcites: Alcamizer-4 made by Kyowa Kagaku Kogyo KK anti-fogging agent: polyglycerin fatty acid ester O-71D made by Riken Vitamin KK anti-bacterial compound A: silver-slilica-alumina-magnesia anti-bacterial agent AIS-NAZ 320 made by Catalyst & Chemicals Ind. Co., Ltd. anti-bacterial compound B: silver-titania anti-bacterial agent ATOMY BALL made by Catalyst & Chemicals Ind. Co., Ltd. anti-bacterial compound C: silver-zeolite anti-bacterial agent

TABLE 1

| composition (weight parts) | Embodiment 1 | Embodiment 2 | Example 1 | Example 2 |
|---|---|---|---|---|
| polyvinyl chloride | 100 | 100 | 100 | 100 |
| di-isononyl adipate | 20 | 20 | 20 | 20 |
| epoxidated linseed oil | 10 | 10 | 10 | 10 |
| stabilizer | 1.0 | 1.0 | 1.0 | 1.0 |
| hydrotalcites | 0.1 | 0.1 | — | 0.1 |
| polyglycerin fatty acid ester | 1.0 | 1.0 | 1.0 | 1.0 |
| anti-bacterial compound A | 0.4 | — | — | — |
| anti-bacterial compound B | — | 0.4 | — | — |
| anti-bacterial compound C | — | — | 0.4 | — |

TABLE 1-continued

| | Embodiment 1 | Embodiment 2 | Example 1 | Example 2 |
|---|---|---|---|---|
| test results | | | | |
| transparency | ⊚ | ⊚ | X | ⊚ |
| clinging property | ⊚ | ⊚ | X | ⊚ |
| anti-fogging property | ⊚ | ⊚ | X | ⊚ |
| anti-bacterial property (extinction ratio %) | 99.7 | 99.5 | 67.4 | −30.5 |

The anti-bacterial food packaging film according to the present invention comprises, for 100 weight parts of PVC resin, 5 to 50 weight parts of a plasticizer, 0.3 to 3.0 weight parts of a stabilizer, 0.02 to 1.0 weight parts of hydrotalcite, 0.5 to 5.0 weight parts of an anti-fogging agent, and 0.02 to 2.0 weight parts of an anti-bacterial compound. According to this composition, it is possible to obtain anti-bacterial food packaging film which is provided with the properties required for such film, such as a clinging property, transparency, and an anti-fogging property, as well as a high anti-bacterial property. This apparently owes to the inclusion of hydrotalcite which is effective in maintaining the anti-bacterial property of the anti-bacterial compound.

Although the present invention has been described in terms of specific embodiments thereof, it is possible to modify and alter details thereof without departing from the spirit of the present invention.

We claim:

1. A self-sustaining anti-bacterial food packaging film having transparency, clinging property anti-fogging property and anti-bacterial property, comprising, for 100 weight parts of PVC resin:

5 to 50 weight parts of a plasticizer;

0.3 to 3.0 weight parts of a stabilizer;

0.02 to 1.0 weight parts of hydrotalcite;

0.5 to 5.0 weight parts of an anti-fogging agent; and 0.02 to 2.0 weight parts of an anti-bacterial compound consisting of inorganic oxo-acid salt whose metallic ions are ion exchanged with different metallic ions having anti-bacterial property, said anti-bacterial ions being selected from the group consisting of Ag, Cu, Zn, Sn, and combinations thereof, wherein said inorganic oxo-acid salt consists of magnesium metasilicate aluminate, said magnesium metasilicate aluminate being used in combination with said hydrotalcite for eliminating the tendency of a thermally molded PVC resin to become tinted.

2. A self-sustaining anti-bacterial food packaging film having transparency, clinging property, anti-fogging property and anti-bacterial property, comprising, for 100 weight parts of PVC resin:

5 to 50 weight parts of a plasticizer;

0.3 to 3.0 weight parts of a stabilizer;

0.02 to 1.0 weight parts of hydrotalcite;

0.5 to 5.0 weight parts of an anti-fogging agent; and 0.02 to 2.0 weight parts of an anti-bacterial compound consisting of inorganic oxide colloidal particles forming a colloidal solution and having different metallic components having anti-bacterial property, said anti-bacterial components being selected from the group consisting of Ag, Cu, Zn, Sn, and combinations thereof, provided with an anti-bacterial property, attached thereto either physically or chemically.

3. A self-sustaining anti-bacterial food packaging film having transparency, clinging property, anti-fogging property and anti-bacterial property according to claim 1, wherein the inorganic oxide colloidal particles consist of a member or a combination of members selected from a group consisting of colloidal particles of simple inorganic oxides such as $SiO_2$, $TiO_2$, $Fe_2O_3$, $Sb_2O_5$ and $WO_3$, and colloidal particles of composite inorganic oxides such as $SiO_2.Al_2O_3$, $SiO_2.B_2O_3$, $SiO_2.P_2O_5$, $TiO_2.CeO_2$, $TiO_2.ZrO_2$, $SiO_2.ZrO_2$, $SnO_2.Sb_2O_5$, $SiO_2.Al_2O_3$, $TiO_2.SiO_2$, $TiO_2.CeO_2$, $ZrO_2.SiO_2$, $Al_2O_3.MgO$, $CaOSiO_2$, and $TiO_2.Fe_2O_3$.

4. A self-sustaining anti-bacterial food packaging film having transparency clinging property, anti-fogging property and anti-bacterial property according to claim 1, wherein the plasticizer consists of a member or a combination of members selected from a group consisting of epoxidated oils such as epoxidated linseed oil, epoxidated soybean oil, epoxidated fatty acid alkyl ester, adipate esters having six to ten carbon atoms and straight or branched alkyl groups, hydroxy polycarbonic esters such as tributyl acetyl citrate, and acetylated triethyl, aliphatic dibasic acid esters such as di-normal butyl sebacate, glycol esters such as penta-erythyritol ester, di-ethylene glycol benzoate, phosphate esters such as triphenyl phosphate, trichlesil phosphate, glycerin diaceto monolaurate, chlorinated parafin, polyester.

5. A sustaining anti-bacterial food packaging film having transparency, clinging property, anti-fogging property and anti-bacterial property according to claim 1, wherein the stabilizer consists of a member or a combination of members selected from a group consisting of acetic acid, propionic acid, heptanoic acid, 2-ethyl hexylic acid, caprylic acid, capric acid, lauric acid, palmitic acid, myristic acid, stearic acid, undecyclic acid, isostearic acid, 12 -hydroxy stearic acid, isodecanoic acid, oleic acid, ricinolic acid, linoleic acid, linolenic acid, docosanoic acid, eicosanoic acid, nodecanoic acid, behelinoleic acid, mixtures of naturally produced fatty acids such as animal fat fatty acid, coconut oil fatty acid, soybean oil fatty acid, wood (tung) oil fatty acid, and rice bran fatty acid, monoacidic carboxylic acids such as lactic acid, citric acid, gluconic acid, sorbic acid, resin acid, actoacetic acid, benzoic acid, naphthenic acid, salicylic acid, p-tert-butyl benzoic acid, butyl benzoic acid, isopropyl benzoic acid, ethyl benzoic acid, toluic acid, xylylic acid, 5-tert-octyl benzoic acid, and cyclo-hyxyl carboxylic acid, diacidic or polyacidic carboxylic acids, such as oxalic acid, malonic acid, succinic acid, glutaric acid, adipic acid, pimelic acid, suberic acid, azelaic acid, sebacic acid, phthalic acid, isophthalic acid, terephthalic acid, crophthalic acid, aminophthalic acid, oxyphthalic acid, maleic acid, fumaric acid, citraconic acid, metaconic acid, isoconic acid, and aconitic acid, calcium or zinc salts of monester carboxylic acides of these substances, organic phosphorous acid esters such as tris-nonyl phosphite, 2-tert-butyl-α(3-tert-butyl-4-hydroxyphenyl)p-cumenyl bis-(p-nonyl phenol)

phosphite, 4,4'-isopropylidene-diphenyl alkyl (C 12-C1 5) phosphite, tris-(2,4-tert-butyl phenyl) phosphite, tris-(dinonyl phenyl) phosphite, and distearyl penta erythritol diphosphite, and β-diketones such as stearoyl benzoyl methane, benzoyl acetyl methane, benzoyl hexanol methane, benzoyl octanol methane, diacethyl benzoyl methane, lauroyl benzoyl methane, dibenzoyl methane, and oleyl benzoyl methane, and metallic complex salts of diketones.

6. A self-sustaining anti-bacterial food packaging film having transparency, clinging property, anti-fogging property and anti-bacterial property according to claim 1, wherein the anti-fogging agent consists of a member or a combination of members selected from a group consisting of monoglycerin fatty acid ester, poly-glycerin fatty acid ester, and sorbitan fatty acid ester.

7. A self-sustaining anti-bacterial food packaging film having transparency, clinging property, anti-fogging property and anti-bacterial property according to claim 2, wherein the plasticizer consists of a member or a combination of members selected from a group consisting of epoxidated oils such as epoxidated linseed oil, epoxidated soybean oil, epoxidated fatty acid alkyl ester, adipate esters having six to ten carbon atoms and straight or branched alkyl groups, hydroxy polycarbonic esters such as tributyl acetyl citrate, and acetylated triethyl, aliphatic dibasic acid esters such as di-normal butyl sebacate, glycol esters such as penta-erythyritol ester, di-ethylene glycol benzoate, phosphate esters such as triphenyl phosphate, trichlesil phosphate, glycerin diaceto monolaurate, chlorinated parafin, polyester.

8. A sustaining anti-bacterial food packaging film having transparency, clinging property, anti-fogging property and anti-bacterial property according to claim 2, wherein the stabilizer consists of a member or a combination of members selected from a group consisting of acetic acid, propionic acid, heptanoic acid, 2-ethyl hexylic acid, caprylic acid, capric acid, lauric acid, palmitic acid, myristic acid, stearic acid, undecyclic acid, isostearic acid, 12-hydroxy stearic acid, isodecanoic acid, oleic acid, ricinolic acid, linoleic acid, linolenic acid, docosanoic acid, eicosanoic acid, nodecanoic acid, behelinoleic acid, mixtures of naturally produced fatty acids such as animal fat fatty acid, coconut oil fatty acid, soybean oil fatty acid, wood (tung) oil fatty acid, and rice bran fatty acid, monoacidic carboxylic acids such as lactic acid, citric acid, gluconic acid, sorbic acid, resin acid, actoacetic acid, benzoic acid, naphthenic acid, salicylic acid, p-tert-butyl benzoic acid, butyl benzoic acid, isopropyl benzoic acid, ethyl benzoic acid, toluic acid, xylylic acid, 5-tert-octyl benzoic acid, and cyclo-hyxyl carboxylic acid, diacidic or polyacidic carboxylic acids, such as oxalic acid, malonic acid, succinic acid, glutaric acid, adipic acid, pimelic acid, suberic acid, azelaic acid, sebacic acid, phthalic acid, isophthalic acid, terephthalic acid, crophthalic acid, aminophthalic acid, oxyphthalic acid, maleic acid, fumaric acid, citraconic acid, metaconic acid, isoconic acid, and aconitic acid, calcium or zinc salts of monester carboxylic acides of these substances, organic phosphorous acid esters such as tris-nonyl phosphite, 2-tert-butyl-α(3-tert-butyl-4-hydroxyphenyl)p-cumenyl bis-(p-nonyl phenol) phosphite, 4,4'-isopropylidene-diphenyl alkyl (C12–C15) phosphite, tris-(2,4-tert-butyl phenyl) phosphite, tris-(dinonyl phenyl) phosphite, and distearyl penta erythritol diphosphite, and β-diketones such as stearoyl benzoyl methane, benzoyl acetyl methane, benzoyl hexanol methane, benzoyl octanol methane, diacethyl benzoyl methane, lauroyl benzoyl methane, dibenzoyl methane, and oleyl benzoyl methane, and metallic complex salts of diketones.

9. A self-sustaining anti-bacterial food packaging film having transparency, clinging property, anti-fogging property and anti-bacterial property according to claim 2, wherein the anti-fogging agent consists of a member or a combination of members selected from a group consisting of monoglycerin fatty acid ester, poly-glycerin fatty acid ester, and sorbitan fatty acid ester.

* * * * *